United States Patent [19]

Toyoda et al.

[11] Patent Number: 5,608,004

[45] Date of Patent: Mar. 4, 1997

[54] WATER BASE COATING COMPOSITION

[75] Inventors: Tsunehiko Toyoda, Yokohama; Harufumi Tsuchiya, Nara-ken; Hiroaki Omoto, Nishinomiya; Mitsuru Kohno, Sanda; Maki Ii, Osaka, all of Japan

[73] Assignee: Dai Nippon Toryo Co., Ltd., Osaka, Japan

[21] Appl. No.: 416,983

[22] Filed: Apr. 5, 1995

[30] Foreign Application Priority Data

Apr. 6, 1994 [JP] Japan ................................. 6-068258

[51] Int. Cl.$^6$ .............................. C08J 3/00; C08K 3/20; C08L 51/00; C08L 67/00
[52] U.S. Cl. ...................... 524/539; 525/437; 525/438; 525/449
[58] Field of Search ........................... 524/539; 525/437, 525/438, 449; 427/388.1

[56] References Cited

U.S. PATENT DOCUMENTS 5,047,294   9/1991   Schwab et al. .................. 428/432.1
5,412,023   5/1995   Hille et al. ........................ 524/539

*Primary Examiner*—Paul R. Michl
*Assistant Examiner*—Patrick Niland
*Attorney, Agent, or Firm*—Oblon, Spivak, McClelland, Maier & Neustadt, P.C.

[57] ABSTRACT

A water base coating composition having a solid content of from 50 to 80 wt % and having a binder component dissolved or dispersed in a solvent mixture comprising water and a hydrophilic organic solvent, said binder component comprising from 30 to 95 wt % of a polyester resin obtained from an aromatic polybasic carboxylic acid or its acid anhydride and a polyhydric alcohol and having a hydroxyl value of from 100 to 280 and an acid value of from 0 to 15, and from 70 to 5 wt % of a melamine resin and/or a benzoguanamine resin.

11 Claims, No Drawings

WATER BASE COATING COMPOSITION

The present invention relates to a high solid thermosetting water base coating composition having a low VOC (volatile organic compounds) value excellent in water resistance and hot water resistance, which is suitable as a coating agent for a metal substrate, particularly for an aluminum substrate.

In recent years, conversion from conventional organic solvent type coating agents to water base coating agents employing, as a solvent, water or a combination of water and an organic solvent, has been rapidly progressed from the viewpoint of prevention of atmospheric pollution, conservation of resources or the like.

As such water base coating agents, water base coating agents employing a binder prepared by incorporating a large amount of carboxyl groups in a resin and then neutralizing them with a neutralizing agent (for example, International Patent Publication No. W088/03159, and Japanese Unexamined Patent Publications No. 52370/1983, No. 255766/1992, No. 342780/1992 and No. 370171/1992) and water base coating agents employing, as a binder, a resin obtained by emulsion polymerization of a monomer in water in the presence of an emulsifier, a dispersant or the like (for example, Japanese Examined Patent Publications No. 47281/1985 and No. 32230/1987 and Japanese Unexamined Patent Publications No. 265905/1988, No. 146967/1989 and No. 43830/1993) are mainly employed.

However, such conventional water base coating agents have problems that the coating films thereby obtained are poor in the water resistance and hot water resistance, since they contain a large amount of carboxyl groups in the resin, or they contain an emulsifier or a dispersant. They also have a problem that the solid content is low i.e. the amount of water is substantial, whereby unless the coated or printed coating agents are sufficiently set and baked, the coating films are likely to have bubbling.

The present invention has been made to overcome such drawbacks of conventional water base coating agents. It is an object of the present invention to provide a high solid thermosetting water base coating composition capable of forming a coating film excellent in the water resistance and hot water resistance, which brings about no or little pollution.

The present inventors have conducted an extensive research to overcome the drawbacks of the conventional water base coating agents and as a result, have found that by using a certain specific binder component and a solvent mixture comprising water and a hydrophilic organic solvent, such a binder can be dissolved or dispersed stably in the solvent without using a neutralizing agent, an emulsifier or the like, and it is possible to obtain a high solid water base coating agent having a low VOC value, and further that the coating film thereby obtained is excellent in the water resistance and hot water resistance. The present invention has been accomplished on the basis of these discoveries. Further, it has been found that by incorporating a certain specific curing accelerator to the water base coating agent, curing can be carried out at a low temperature within a short period of time without deterioration of the storage stability such as the viscosity increase, and the coating film thereby obtained has improved adhesion and corrosion resistance. A second aspect of the present invention has been accomplished on the basis of these discoveries.

Thus, according to the first aspect, the present invention provides a water base coating composition having a solid content of from 50 to 80 wt % and having a binder component dissolved or dispersed in a solvent mixture comprising water and a hydrophilic organic solvent, said binder component comprising from 30 to 95 wt % of a polyester resin obtained from an aromatic polybasic carboxylic acid or its acid anhydride and a polyhydric alcohol and having a hydroxyl value of from 100 to 280 and an acid value of from 0 to 15, and from 70 to 5 wt % of a melamine resin and/or a benzoguanamine resin.

According to the second aspect, the present invention provides a water base coating composition having a pH of from 6 to 10 and a solid content of from 50 to 80 wt % and having a binder component and an epoxy phosphoric acid ester resin curing accelerator dissolved or dispersed in a solvent mixture comprising water and a hydrophilic organic solvent, said binder component comprising from 30 to 95 wt % of a polyester resin obtained from an aromatic polybasic carboxylic acid or its acid anhydride and a polyhydric alcohol and having a hydroxyl value of from 100 to 280 and an acid value of from 0 to 15, and from 70 to 5 wt % of a melamine resin and/or a benzoguanamine resin.

Now, the present invention will be described in detail.

The binder component constituting the water base coating composition of the first aspect of the present invention, comprises a polyester resin and, as a crosslinking agent, a melamine resin and/or a benzoguanamine resin. This polyester resin is the one which can be obtained by polycondensing a polybasic carboxylic acid or its acid anhydride with a polyhydric alcohol in accordance with a conventional method. As the polybasic carboxylic acid or its acid anhydride, an aromatic polybasic carboxylic acid or a polybasic carboxylic acid comprising an aromatic polybasic carboxylic acid as the main component (more than 80 mol %), or its acid anhydride, is used in the present invention, so that the water resistance of the resulting coating film will be good. Specifically, phthalic acid, isophthalic acid, terephthalic acid, naphthalenedicarboxylic acid, trimellitic acid or pyromellitic acid, and their anhydrides may be mentioned as typical examples.

In the present invention, an aliphatic or alicyclic polybasic carboxylic acid or its acid anhydride, such as adipic acid, succinic acid, azelaic acid, maleic acid, fumaric acid, itaconic acid, tetrahydrophthalic acid, methylcyclohexene tricarboxylic acid, himic acid or cyclohexanedicarboxylic acid, or an anhydride thereof, may be used in combination with an aromatic polybasic carboxylic acid or its acid anhydride, in an amount of less than 20 mol %, preferably not more than 10 mol %, of the total polybasic carboxylic acid or its acid anhydride component. If it is used in combination in an amount of 20 mol % or more, the water resistance of the coating film tends to be poor, such being undesirable. If desired, a monocarboxylic acid such as benzoic acid may be incorporated in an amount of less than 2 mol % of the total polybasic carboxylic acid or its acid anhydride component.

In the present invention, as the polyhydric alcohol, a usual alcohol component for polyester, such as ethylene glycol, diethylene glycol, propanediol, neopentyl glycol, triethylene glycol, dipropylene glycol, butylene glycol, hexanediol, trimethylol propane, glycerol, sorbitol, pentanediol, octadecanediol or pentaerythritol may be used without any particular restriction. Glycidyl esters or glycidyl ethers may be used in combination with the polyhydric alcohol for modification.

With respect to the characteristic values of the polyester resin to be used in the present invention, the hydroxyl value is from 100 to 280, preferably from 120 to 250, and the acid value is from 0 to 15, preferably not higher than 10. Further, the weight average molecular weight is usually from 500 to 30,000, preferably from 1,000 to 10,000. If the hydroxyl value is lower than the above range, the affinity to water tends to be small, and the storage stability of the composition tends to be poor. Accordingly, a larger amount of an organic solvent is required. Further, crosslinking tends to be less during the curing, whereby the hardness or toughness of the coating film tends to be low. On the other hand, if the hydroxyl value is higher than the above range, the flexibility of the resulting coating film tends to be poor. Further, if the acid value is higher than the above range, the viscosity of the composition tends to be high, and the water resistance of the coating film thereby obtained tends to be low, such being undesirable.

In the present invention, a melamine resin having a triazine ring or a benzoguanamine resin having a triazine ring and an aromatic ring, is used as a crosslinking agent to improve the water resistance and hot water resistance of the coating film thereby obtained. Specifically, an alkyl-etherified melamine resin, an alkyl-etherified benzoguanamine resin, or an alkyl-etherified resin of diguanamine having two triazine rings bonded to a phenylene nucleus, may be mentioned as a typical example. In the present invention, a benzoguanamine resin having an aromatic ring and a triazine ring, is particularly preferred. A urea resin which is also an amino plasto resin, does not have a triazine ring and accordingly is inferior in the water resistance or hot water resistance, and it is not advisable to incorporate such a urea resin in a large amount. However, it is possible to incorporate such a urea resin in an amount of up to 15 wt % in the total crosslinking agent.

The binder component in the present invention comprises the polyester resin and the crosslinking agent, as described above. The blend ratio of the two is usually from 30:70 to 95:5, preferably from 40:60 to 80:20, as the weight ratio of the polyester resin to the crosslinking agent. If the polyester resin is less than this range, the crosslinking agent tends to react by itself, whereby the flexibility, chemical resistance, etc. of the coating film tend to deteriorate. On the other hand, if it is more than the above range, the crosslinking density tends to be low, whereby the water resistance, the hot water resistance, the solvent resistance, etc. tend to be low.

In the present invention, as the binder component, other resin such as an epoxy resin, a xylene resin or an acrylic resin may be used in combination as a part of the component.

In the present invention, as the solvent component constituting the water base coating composition, a solvent mixture comprising water and a hydrophilic organic solvent, is used. The hydrophilic organic solvent may, for example, be a solvent which is freely soluble in water at room temperature, such as methanol, ethanol, n-propanol, isopropanol, tert-butanol, ethylene glycol, acetone, ethylene glycol monoethyl ether, ethylene glycol monobutyl ether, ethylene glycol monomethyl ether acetate, propylene glycol monomethyl ether, propylene glycol monoethyl ether, 3-methyl-3-methoxybutanol or diethylene glycol monoethyl ether, or a solvent which is soluble in water at room temperature to some extent, such as sec-butanol, methyl ethyl ketone, ethyl formate, methyl acetate or propylene glycol monomethyl ether acetate. Such solvents may be used alone or in combination as a mixture of two or more of them. In addition to such a hydrophilic organic solvent, a small amount of a hydrophobic organic solvent such as mineral spirit, toluene or xylene may be incorporated.

The blend ratio of the water and the hydrophilic organic solvent varies depending upon the solid content of the water base coating composition, the hydroxyl value of the polyester resin, etc. However, the weight ratio of the water to the hydrophilic organic solvent is usually from 15:85 to 70:30, preferably from 20:80 to 55:45. If the amount of the organic solvent is less than this range, the storage stability under a high solid condition as an object of the present invention tends to be low. On the other hand, if it is more than the above range, the VOC value tends to be high, such being undesirable from the viewpoint of prevention of atmospheric pollution or conservation of resources.

The water base coating composition according to the first aspect of the present invention comprises the above described binder component and the solvent mixture as essential components, and may further contain various additives including a pigment such as a coloring pigment or an extender pigment, an acidic catalyst, a leveling agent, a defoaming and a lubricant, as the case requires.

With respect to the blend proportions of the respective components, the composition comprises from 0 to 300 parts by weight, preferably from 0 to 100 parts by weight, of the pigment and from 0 to 20 parts by weight, preferably from 1 to 10 parts by weight, of the additives, per 100 parts by weight of the binder component. The solvent mixture is incorporated so that the solid content of the water base coating composition would be from 50 to 80 wt %.

According to the second aspect, the present invention provides a water base coating composition having a pH of 6 to 10 and a solid content of from 50 to 80 wt % and having an epoxy phosphoric acid ester curing accelerator incorporated to the water base coating composition according to the first aspect of the present invention which comprises the above-mentioned binder component and the solvent mixture as the essential components and which may contain a pigment or additives, as the case requires.

The curing accelerator constituting the water base coating composition of the present invention can be produced, for example, by the following method. Namely, a phosphoric acid component such as orthophosphoric acid, a phosphoric acid condensate or pyrophosphoric acid is heat-reacted to an epoxy resin which preferably has an epoxy equivalent of from about 175 to 10,000, in the presence of a catalyst such as an imidazole or a phosphonium salt for triesterification or diesterification, followed by hydrolysis to obtain a monoesterified epoxy phosphoric acid ester resin curing accelerator.

Such a curing accelerator has a hydroxyl group and a phosphoric acid residue in its molecule and thus accelerate curing of the coating film and at the same time reacts with the binder to provide excellent crosslinking accelerating effects. Yet, it contributes to improvement of the adhesion and the corrosion resistance.

As a commercial product of such an epoxy phosphoric acid ester resin curing accelerator, XU-8096.07, XU-71899.00, XQ-82294.01 and DER621-EB50 (tradenames, manufactured by Dow Chemical Japan), Epototo ZX1300 and ZX1300-1 (tradenames, manufactured by Toto Kasei K. K.) may, for example, be mentioned.

The water base coating composition according to the second aspect of the present invention is required to have a pH of from 6 to 10, preferably a pH of from 7 to 9, so that the above-mentioned epoxy phosphoric acid ester resin curing accelerator is stably dissolved in the composition. For this purpose, as a neutralizing agent, an amine compound such as methylamine, diethylamine, trimethylamine, triethylamine, cyclohexylamine, diaminobenzene, ethylenimine, ethanolamine, dimethylethanolamine or diethanolamine, or ammonia may be used as a typical example. The water base coating composition according to the second aspect of the present invention comprises from 1 to 30 parts by weight, preferably from 5 to 20 parts by weight of the curing accelerator, from 0 to 300 parts by weight, preferably from 0 to 100 parts by weight, of the pigment and from 0 to 20 parts by weight, preferably from 1 to 10 parts by weight, of the additives, per 100 parts by weight of the above described binder component. Further, the solvent mixture is incorporated so that the solid content of the water base coating composition would be from 50 to 80 wt %.

The water base coating composition of the present invention is coated or printed on a substrate of a metal such as aluminum, stainless steel or steel, particularly preferably on an aluminum substrate, by a coating method such as roll coating, flow coating, spray coating or dip coating, or by a printing method such as gravure printing or screen printing, so that the dried film thickness would be from about 1 to 200 μm, preferably from 2 to 100 μm.

In the case of the water base coating composition according to the first aspect of the present invention, the coating film can be cured within a wide range of baking conditions ranging from baking at a temperature of from 100° to 200° C. for from 1 to 30 minutes to baking at a temperature of from 220° to 250° C. for a short period of time of a few tens seconds.

On the other hand, in the case of the water base coating composition according to the second aspect of the present invention, curing of the coating film is preferably conducted by baking at a temperature of from 150° to 200° C. for a short period of time of a few tens seconds, but it is possible to conduct baking at a baking temperature of not higher than 150° C. for a few minutes.

Further, when the epoxy phosphoric acid ester resin curing accelerator is incorporated, the composition will be excellent in low temperature curing in a short period of time without bringing about deterioration of the storage stability such as a viscosity increase, in addition to the above effects.

Now, the present invention will be described in further detail with reference to Examples. However, it should be understood that the present invention is by no means restricted to such specific Examples.

In the following Preparation Examples, Examples and Comparative Examples, "parts" and "%" mean "parts by weight" and "wt %", respectively.

PREPARATION EXAMPLES 1 TO 7

Various components as identified in Table 1 were used in amounts (parts) as identified in Table 1, and polyester resin varnishes A to G were prepared in accordance with a conventional method under the conditions as identified in Table 1. The properties of the resins thus prepared are also shown in Table 1. In Table 1, "Carjular E" (tradename, manufactured by Yuka Shell Epoxy K. K.) is a synthetic fatty acidepichlorohydrin ester.

TABLE 1

| Polyester resin varnishes | | | A | B | C | D | E | F | G |
| --- | --- | --- | --- | --- | --- | --- | --- | --- | --- |
| Amounts (parts) of components | Phthalic anhydride | | 40.0 | | 20.0 | 40.0 | 40.0 | 40.0 | 33.3 |
| | Isophthalic acid | | | 44.7 | 22.4 | | | | |
| | Trimellitic anhydride | | | | | | | 14.4 | |
| | Adipic acid | | | | | | | | 14.2 |
| | Neopentyl glycol | | 27.4 | 21.4 | 27.4 | 33.8 | 14.6 | 27.4 | 28.0 |
| | Pentaerythritol | | 8.0 | 4.7 | 10.4 | 11.6 | 4.4 | 8.0 | 8.1 |
| | Carjular E | | 20.0 | 20.0 | 20.0 | 20.0 | 20.0 | 20.0 | 20.0 |
| | Xylene | | 5.0 | 5.0 | 5.0 | 5.0 | 4.0 | 5.0 | 5.0 |
| Reaction conditions | Temperature (°C.) | | 230 | 250 | 250 | 230 | 230 | 210 | 230 |
| | Time (hrs) | | 10 | 8 | 8 | 6 | 12 | 8 | 10 |
| Dilution | Diluted with butyl cellosolve | Varnish viscosity (stokes poise/20° C.) | 25 | 40 | 24 | 18 | 46 | 50 | 35 |
| | | Varnish solid content (%) | 70 | 70 | 70 | 70 | 70 | 70 | 70 |
| Resin properties | Weight average molecular weight | | 2300 | 3200 | 2300 | 2000 | 4600 | 4200 | 6000 |
| | Hydroxyl value | | 240 | 120 | 280 | 360 | 60 | 180 | 210 |
| | Acid value | | 5 | 8 | 1 | 1 | 7 | 60 | 8 |

The water base coating composition of the present invention does not require neutralization of a resin of a high acid value with a neutralizing agent as required by a conventional water base coating composition and does not use an emulsifier or the like. Further, it uses an aromatic polybasic carboxylic acid as the acid component of the polyester resin and uses a crosslinking agent having a triazine ring, whereby the film thereby obtained is excellent in water resistance and hot water resistance. Further, it has a low VOC value and a high solid content, whereby it contributes to prevention of atmospheric pollution or conservation of resources. Further, its water content is little and thus has a feature that bubbling scarcely forms as compared with a conventional water base coating agent.

EXAMPLES 1 TO 4 AND COMPARATIVE EXAMPLES 1 TO 6

Various components as identified in Table 2 were mixed in amounts (parts) as identified in Table 2 to obtain water base coating compositions. Each water base coating composition thus obtained was coated on a chromate-treated aluminum plate (thickness: 0.2 mm) by a roll coater so that the dried film thickness would be 8 μm, then set for 5 seconds and thereafter baked at 225° C. for 90 seconds. With respect to the coated plate thus obtained, tests for the hardness, the water resistance and the impact resistance were conducted, and the results are shown in Table 3.

EXAMPLES 5 TO 8 AND COMPARATIVE EXAMPLES 7 TO 12

Various components as identified in Table 2 were mixed in amounts (parts) as identified in Table 2, and adjusted to pH8 with methylamine (neutralizing agent) to obtain water base coating compositions. The properties of the water base coating compositions thus obtained are shown in Table 2. Each water coating composition thus obtained was coated on a chromate-treated aluminum plate (thickness: 0.2 mm) by a roll coater so that the dried film thickness would be 8 μm, then set for 5 seconds and thereafter baked at 200° C. for 60 seconds. With respect to the coated plate thus obtained, tests for the hardness, the water resistance and the impact resistance were conducted, and the appearance of the coating film was visually evaluated, and the results are shown in Table 3.

In Tables 2 and 3, "water-soluble polyester varnish" is "Water Sol S199-iM" (manufactured by Dainippon Ink and Chemicals, Inc.), solid content: 59%; "melamine resin (A)" is "Sumimal MC-1" (manufactured by Sumitomo Chemical Co., Ltd.), solid content 78%; "melamine resin (B)" is "Sumimal M40W" (manufactured by Sumitomo Chemical Co., Ltd.), solid content: 80%; "melamine resin (C)" is "Cymel 325" (manufactured by Mitsui Cyanamid K. K.), solid content: 100%; "benzoguanamine resin solution (A)" is "Mycoat 102" (manufactured by Mitsui Cyanamid K. K.), solid content: 70%; "benzoguanamine resin solution (B)" is "Mycoat 105" (manufactured by Mitsui Cyanamid K. K.), solid content: 70%; "urea resin solution" is "Yuban 10S" (manufactured by Mitsui Toatsu Chemical Co., Ltd.), solid content: 60%; "epoxy phosphoric acid ester resin curing accelerator" is "XQ-82294.01" (manufactured by Dow Chemical Japan), solid content: 50%; "bisphenol A type epoxy resin solution" is Epicoat #1001-70X (manufactured by Yuka Shell Epoxy K. K.), solid content: 70%, epoxy equivalent: 450 to 500; "VOC value" i.e. the amount of the volatile organic solvent in the coating material, is the value calculated by the following formula:

$$VOC = \frac{(V - V_W) \times 8.345}{\frac{100}{D} - \frac{v_W}{DH_2O}} \text{ (Lbs/gallon)}$$

where, V, volatile content (wt %) in the coating material
$V_W$: water content (wt %) in the coating material
D: density of the coating material (25° C., g/ml)
$DH_2O$: density of water (25° C., 0.997 g/ml)
"Pencil hardness" is the value measured in accordance with JIS K5400; "water resistance" is the visual evaluation of the appearance of the coating film after immersion; "impact resistance" is tested by a Dupont system (½×300 gr×20 cm) and evaluated by O: no abnormality and X: abnormality such as cracking or peeling occurred; and "appearance of the coating film" is the visual evaluation of the appearance of the coating film and represented by O: no abnormality and X: bubbles observed.

TABLE 2

| | Examples | | | | | | | |
|---|---|---|---|---|---|---|---|---|
| | 1 | 2 | 3 | 4 | 5 | 6 | 7 | 8 |
| Amounts (parts) of constituting components | | | | | | | | |
| Polyester resin varnish (A) | 100 | 85.7 | | | 100 | 85.7 | | |
| Polyester resin varnish (B) | | | 85.7 | | | | 78.6 | |
| Polyester resin varnish (C) | | | | 71.4 | | | | 71.4 |
| Polyester resin varnish (D) | | | | | | | | |
| Polyester resin varnish (E) | | | | | | | | |
| Polyester resin varnish (F) | | | | | | | | |
| Polyester resin varnish (G) | | | | | | | | |
| Water soluble polyester varnish | | | | | | | | |
| Melamine resin solution (A) | 38.7 | | | | 38.7 | | | |
| Melamine resin solution (B) | | | 25 | 25 | | | 25 | 25 |
| Melamine resin solution (C) | | | 10 | | | | 15 | |
| Benzoguanamine resin solution (A) | | 57.1 | | | | 57.1 | | |
| Benzoguanamine resin solution (B) | | | | 28.6 | | | | 14.3 |
| Urea resin solution | | | | | | | | |
| Epoxyphosphoric acid ester resin curing accelerator | | | | | 20 | 15 | 10 | 30 |
| Bisphenol A type epoxy resin solution | | | 14.3 | 14.3 | | | 7.1 | 7.1 |
| Xylene | | | | | | | | |
| Mineral terpen | | | 2 | | | | 2 | |
| Butyl cellosolve | 5.9 | | 12.5 | | | | 5 | |
| n-butanol | | | | | | | | |
| Water | 16.0 | 17.8 | 13.5 | 16.2 | 17.5 | 17.3 | 20.0 | 9.7 |
| Additives | 1.2 | 1.2 | 1.2 | 1.2 | 1.2 | 1.2 | 1.2 | 1.2 |
| Properties of coating material | | | | | | | | |
| Non-volatile component (%) | 62 | 62 | 63 | 64 | 62 | 61 | 61 | 63 |
| Viscosity (Fordcup #4/25° C.) (sec) | 95 | 90 | 98 | 87 | 95 | 90 | 98 | 87 |
| VOC value | 2.5 | 2.8 | 2.7 | 2.5 | 2.5 | 3.0 | 2.6 | 2.8 |

| | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Amounts (parts) of constituting components | | | | | | | | | | | | |
| Polyester resin varnish (A) | | | | | | 100 | | | | | 100 | |

TABLE 2-continued

| | | | | | | | | | | | | |
|---|---|---|---|---|---|---|---|---|---|---|---|---|
| Polyester resin varnish (B) | | | | | | | | | | | | |
| Polyester resin varnish (C) | | | | | | | | | | | | |
| Polyester resin varnish (D) | 100 | | | | | 100 | | | | | | |
| Polyester resin varnish (E) | | 100 | | | | | 100 | | | | | |
| Polyester resin varnish (F) | | | | 71.4 | | | | | | 85.7 | | |
| Polyester resin varnish (G) | | | 100 | | | | | 100 | | | | |
| Water soluble polyester varnish | | | | | 119 | | | | | | | 119 |
| Melamine resin solution (A) | 38.7 | 38.7 | 38.7 | 25.8 | | 38.7 | 38.7 | 38.7 | 38.7 | | | 38.7 |
| Melamine resin solution (B) | | | | | | | | | | 25 | | |
| Melamine resin solution (C) | | | | | | | | | | 15 | | |
| Benzoguanamine resin solution (A) | | | | 28.6 | | | | | | | | |
| Benzoguanamine resin solution (B) | | | | | | | | | | | | |
| Urea resin solution | | | | | 50 | | | | | | 50 | |
| Epoxyphosphoric acid ester resin curing accelerator | | | | | | 20 | 20 | 20 | 10 | | 20 | 20 |
| Bisphenol A type epoxy resin solution | | | | 14.3 | | | | | | | | |
| Xylene | | 3 | | | | | | 13.2 | | | | |
| Mineral terpen | | | 2 | | | | | | 2 | | | |
| Butyl cellosolve | 1.4 | 26.3 | 6.3 | 6.6 | 0.6 | | | | | 6 | | |
| n-butanol | | | | 3.0 | | | | | | 4 | | |
| Water | 15.4 | 3.7 | 13.6 | 16.3 | 10.0 | 71 | 12.0 | | 15.5 | 20.0 | 9.1 | 71 |
| Additives | 1.2 | 1.2 | 1.2 | 1.2 | 1.2 | 1.2 | 1.2 | 1.2 | 1.2 | 1.2 | 1.2 | 1.2 |
| Properties of coating material | | | | | | | | | | | | |
| Non-volatile component (%) | 64 | 58 | 62 | 60 | 62 | 43.6 | 64 | 64 | 62 | 60 | 61 | 44 |
| Viscosity (Fordcup #4/25° C.) (sec) | 87 | 90 | 81 | 105 | 85 | 90 | 87 | 90 | 81 | 105 | 85 | 90 |
| VOC value | 2.4 | 3.3 | 2.6 | 2.8 | 3.1 | 2.9 | 2.5 | 3.3 | 2.6 | 2.7 | 3.3 | 3.4 |

TABLE 3

| | Examples | | | | | | | |
|---|---|---|---|---|---|---|---|---|
| | 1 | 2 | 3 | 4 | 5 | 6 | 7 | 8 |
| Pencil hardness | | | | | | | | |
| Room temeprature hardness | 4H | 4H | 4H | 5H | 4H | 4H | 4H | 5H |
| Hardness after immersion in hot water of 90° C. for 30 minutes | HB | 2H | HB | 2H | 2H | 2H | 2H | 2H |
| Water resistance | | | | | | | | |
| Immersion at 20° C. for 20 days | No abnormality | No abnormality | No abnormality | No abnormality | No abnormality | No abnormality | No abnormality | No abnormality |
| Immersion at 90° C. for 30 minutes | No abnormality | No abnormality | No abnormality | No abnormality | No abnormality | No abnormality | No abnormality | No abnormality |
| Impact resitance | ○ | ○ | ○ | ○ | ○ | ○ | ○ | ○ |
| Appearance of the coating material | ○ | ○ | ○ | ○ | ○ | ○ | ○ | ○ |

| | Comparative Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Pencil hardness | | | | | | | | | | | | |
| Room temeprature hardness | 5H | 3H | 4H | 4H | H | 2H | 5H | 3H | 4H | 4H | H | 2H |
| Hardness after immersion in hot water of 90° C. for 30 minutes | 4B | 4B | <6B | 3B | <6B | 6B | HB | 4B | <6B | 3B | <6B | 6B |
| Water resistance | | | | | | | | | | | | |
| Immersion at 20° C. for 20 days | No abnormality | No abnormality | No abnormality | No abnormality | No abnormality | No abnormality | No abnormality | No abnormality | | | | |
| Immersion at 90° C. for 30 minutes | Whitening | Whitening | No abnormality | Whitening | Whitening | No abnormality | Whitening | Whitening | No abnormality | Whitening | Whitening | No abnormality |
| Impact resitance | X | ○ | ○ | ○ | ○ | ○ | X | ○ | ○ | X | ○ | ○ |
| Appearance of the coating material | ○ | ○ | ○ | ○ | ○ | X | ○ | ○ | ○ | ○ | ○ | X |

As is evident from the data in Table 3, in Examples 1 to 8 representing the water base coating composition of the present invention, excellent coating film properties were obtained.

On the other hand, among Comparative Examples 1 to 6 wherein no epoxy phosphoric acid ester resin curing accelerator was employed and Comparative Examples 7 to 12 wherein an epoxy phosphoric acid ester resin curing accelerator was employed, in the case of Comparative Examples 1 and 7 wherein a polyester resin having a large hydroxyl value was used, hot water resistance and the impact resistance were poor. In Comparative Examples 2 and 8 wherein a polyester resin having a small hydroxyl value was used, a large amount of an organic solvent was required to secure the stability of the coating material, whereby the VOC value tended to be high, and the hot water resistance was poor. In Comparative Examples 3 and 9 wherein an aliphatic polybasic carboxylic acid was used excessively, the hardness in hot water was low, the coating was susceptible to scratching. In Comparative Examples 4 and 10 wherein a polyester resin having a large acid value was used, the hot water resistance was poor. In Comparative Examples 5 and 11 wherein a urea resin was used as a crosslinking agent, the hot water resistance was poor. In Comparative Examples 6 and 12 wherein the amount of water was substantial as conventional water base coating compositions, bubbles were formed in the coating films when the setting time was short.

We claim:

1. A water base coating composition having a solid content of from 50 to 80 wt % and having a curable binder component dissolved or dispersed in a solvent mixture comprising water and a hydrophilic organic solvent, said curable binder component comprising from 30 to 95 wt % of a crosslinkable polyester resin obtained from an aromatic polybasic carboxylic acid or its acid anhydride and a polyhydric alcohol and having a hydroxyl value of from 100 to 280 and an acid value of from 0 to 15, and as a crosslinking agent from 70 to 5 wt % of a melamine resin and/or a benzoguanamine resin.

2. A water base coating composition having a solid content of from 50 to 80 wt % and having a curable binder component dissolved or dispersed in a solvent mixture comprising water and a hydrophilic organic solvent, said curable binder component comprising from 30 to 95 wt % of a crosslinkable polyester resin obtained from a polybasic carboxylic acid or its acid anhydride comprising more than 80 mol % of an aromatic polybasic carboxylic acid or its acid anhydride and less than 20 mol % of an aliphatic or alicyclic polybasic alcohol and having a hydroxyl value of from 100 to 280 and an acid value of from 0 to 15, and as a crosslinking agent from 70 to 5 wt % of a melamine resin and/or a benzoguanamine resin.

3. A water base coating composition having a pH of from 6 to 10 and a solid content of from 50 to 80 wt % and having a curable binder component and an epoxy phosphoric acid ester resin curing accelerator having a phosphoric acid residue and hydroxy group dissolved or dispersed in a solvent mixture comprising water and a hydrophilic organic solvent, said curable binder component comprising from 30 to 95 wt % of a crosslinkable polyester resin obtained from an aromatic polybasic carboxylic acid or its acid anhydride and a polyhydric alcohol and having a hydroxyl value of from 100 to 280 and an acid value of from 0 to 15, and as a crosslinking agent from 70 to 5 wt % of a melamine resin and/or a benzoguanamine resin.

4. A water base coating composition having a pH of from 6 to 10 and a solid content of from 50 to 80 wt % and having a curable binder component and an epoxy phosphoric acid ester resin curing accelerator having a phosphoric acid residue and hydroxy group dissolved or dispersed in a solvent mixture comprising water and a hydrophilic organic solvent, said binder component comprising from 30 to 95 wt % of a crosslinkable polyester resin obtained from a polybasic carboxylic acid or its acid anhydride comprising more than 80 mol % of an aromatic polybasic carboxylic acid or its acid anhydride and less than 20 mol % of an aliphatic or alicyclic polybasic carboxylic acid or its acid anhydride, and a polyhydric alcohol and having a hydroxyl value of from 100 to 280 and an acid value of from 0 to 15, and as a crosslinking agent from 70 to 5 wt % of a melamine resin and/or a benzoguanamine resin.

5. The water base coating composition according to claim 3 or 4, wherein the epoxy phosphoric acid ester resin curing accelerator is incorporated in an amount of from 1 to 30 parts by weight per 100 parts by weight of the binder component.

6. The process of preparing a coated aluminum substrate which comprises coating the aluminum substrate with the water base coating composition of claim 1 and baking the coated substrate to cure the applied coating.

7. The process of preparing a coated aluminum substrate which comprises coating the aluminum substrate with the water base coating composition of claim 2 and baking the coated substrate to cure the applied coating.

8. The process of preparing a coated aluminum substrate which comprises coating the aluminum substrate with the water base coating composition of claim 3 and baking the coated substrate to cure the applied coating.

9. The process of preparing a coated aluminum substrate which comprises coating the aluminum substrate with the water base coating composition of claim 6 and baking the coated substrate to cure the applied coating.

10. The water base coating composition of claim 1 wherein the ratio of the water to the hydrophilic organic solvent is 15:85 to 70:30%.

11. The water base coating composition of claim 3 wherein the ratio of the water to the hydrophilic organic solvent is 15:85 to 70:30%.

* * * * *